United States Patent
Di Giuseppantonio et al.

(10) Patent No.: US 8,647,715 B2
(45) Date of Patent: Feb. 11, 2014

(54) PROCESS FOR INCREASING THE ABRASION RESISTANCE OF A PRE-DETERMINABLE PART OF THE SURFACE OF A GLASS CONTAINER

(75) Inventors: Vincenzo Di Giuseppantonio, Fidenza (IT); Ivano Davoli, Noceto (IT); Antonio Bruscella, Reggio Emilia (IT)

(73) Assignee: Bormioli Luigi S.p.A., Parma (IT)

( * ) Notice: Subject to any disclaimer, the term of this patent is extended or adjusted under 35 U.S.C. 154(b) by 568 days.

(21) Appl. No.: 12/705,123

(22) Filed: Feb. 12, 2010

(65) Prior Publication Data

US 2010/0203271 A1 Aug. 12, 2010

(30) Foreign Application Priority Data

Feb. 11, 2009 (IT) .............................. MI2009A0177

(51) Int. Cl.
*C03C 17/23* (2006.01)

(52) U.S. Cl.
USPC ......... 427/287; 427/269; 427/384; 427/419.5

(58) Field of Classification Search
USPC ................. 427/269, 287, 279, 282; 65/60.52; 215/374
See application file for complete search history.

(56) References Cited

U.S. PATENT DOCUMENTS

| | | | |
|---|---|---|---|
| 1,382,994 A * | 6/1921 | Lott ................................. | 65/130 |
| 3,004,863 A | 10/1961 | Gray, Jr. et al. | |
| 3,051,593 A * | 8/1962 | Gray, Jr. et al. ............... | 427/384 |
| 3,161,534 A | 12/1964 | Dettre et al. | |
| 3,323,889 A * | 6/1967 | Carl et al. ....................... | 65/60.2 |
| 3,387,994 A * | 6/1968 | Dunton, III et al. .......... | 427/314 |
| 3,425,859 A | 2/1969 | Steigelman et al. | |
| 3,463,658 A * | 8/1969 | Sidney ......................... | 428/34.6 |
| 3,487,035 A | 12/1969 | Bogart | |
| 3,690,289 A | 9/1972 | Frank | |
| 3,934,063 A * | 1/1976 | Dubble ......................... | 427/223 |
| 4,012,190 A * | 3/1977 | Dicks et al. ................... | 432/144 |

* cited by examiner

*Primary Examiner* — Michael Cleveland
*Assistant Examiner* — Alex A Rolland
(74) *Attorney, Agent, or Firm* — Oblon, Spivak, McClelland, Maier & Neustadt, L.L.P.

(57) ABSTRACT

The present invention relates to a process for increasing the abrasion resistance of a pre-determinable part of the surface of an annealed glass container comprising the following operative phases: a) applying a liquid composition comprising an organo-titanate compound on a pre-determinable part of the annealed glass container surface by spraying at room temperature; b) selectively heat-treating the surface on which the liquid composition of step a) has been applied at a temperature between the glass annealing temperature and glass softening temperature, said selective heat treatment resulting in the formation of a titanium oxide coating layer on said surface.

11 Claims, 3 Drawing Sheets

Figure 1:
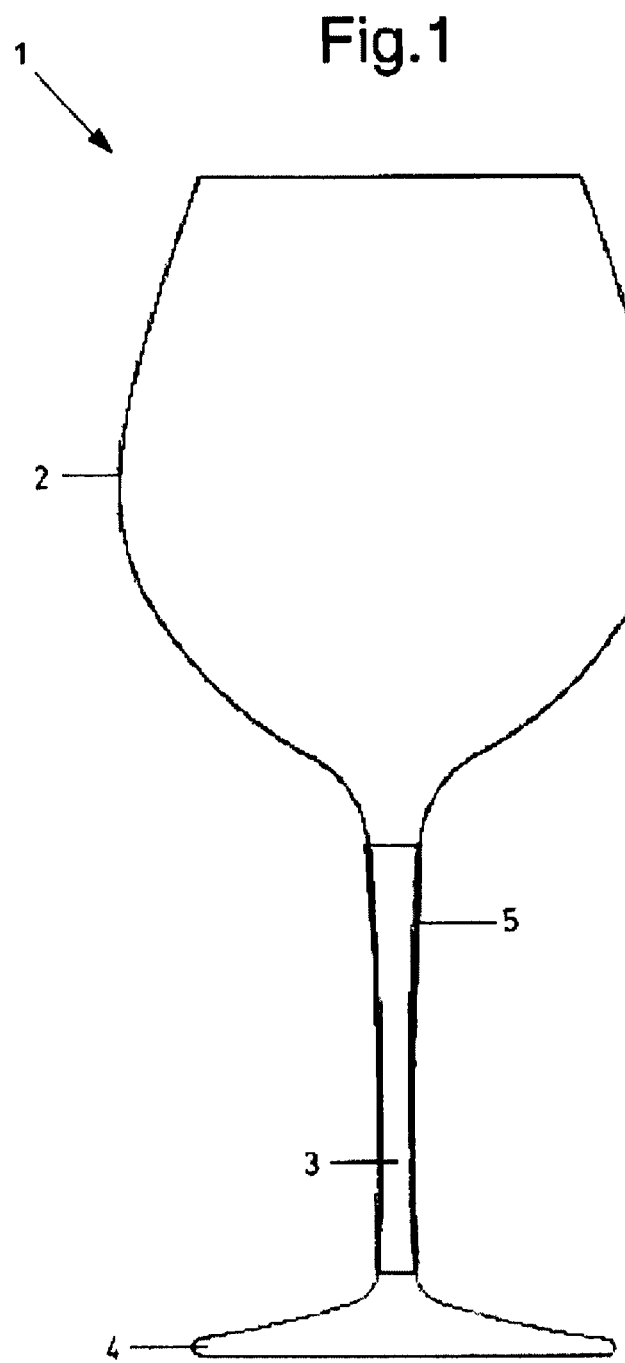

PROCESS FOR INCREASING THE ABRASION RESISTANCE OF A PRE-DETERMINABLE PART OF THE SURFACE OF A GLASS CONTAINER

The present invention relates to a process for increasing the abrasion resistance of a pre-determinable part of the surface of a glass container.

In particular, the present invention relates to a process for increasing the abrasion resistance of a glass container, especially a goblet, by the deposition of a layer of protective coating containing titanium.

Glass containers, such as for example bottles, vases, etc., are commonly subjected to surface treatment in order to protect the glass surface from abrasion.

The most common surface treatment is based on the application of a layer of protective coating over the whole surface of the container. In particular, surface coating processes have the purpose of protecting the surfaces of glass containers from damage caused by friction of the containers against each other or contact of the containers with the devices used for moving them in production plants or during use. This damage can be caused on production lines, for example, with the passage of the containers through quality control systems or during the packaging and filling operations of the containers. The protective coating applied increases the resistance of the surface of the container from abrasion, and also its smoothness through a reduction in the friction coefficient of the surface.

The mechanical properties of glass objects (for example, impact strength) generally strictly depend on the presence of surface defects. A surface defect, in fact, represents the point which triggers the breakage of the object and its presence on the surface therefore has the effect of enormously diminishing its mechanical resistance. By protecting the surface of the glass object from the formation of possible defects or damage, it is consequently possible to preserve and maintain its mechanical properties.

The most widely-used surface treatment currently adopted for protecting the surfaces of glass containers is based on processes called "Hot-End Coating" (HEC) and "Cold-End Coating" (CEC).

The HEC process comprises a treatment of the container leaving the forming machine, i.e. when the temperature of the container is higher than 500° C., with a suitable metallic compound in vapour phase.

The CEC process, on the other hand, is a treatment which is possibly effected on the container leaving the annealing oven with a suitable organic lubricating compound.

In the HEC treatment, easily vaporizable tin or titanium compounds are used for applying the protective coating layer to the surface of glass containers, in the past $SnCl_4$ and $TiCl_4$, currently substituted by n-butyl tin trichloride.

For this purpose, the surface of the glass container is exposed to vapours of the above compounds which, in contact with the hot surface of the glass, pyrolize and react with the surface forming a film of chemically bound tin or titanium oxide.

The HEC treatment is effected in specific chambers (hereafter also indicated with the term "HEC chambers") situated along the production line of the containers. Inside the chambers the containers are exposed to an atmosphere consisting of vapours of the metallic compound.

The coating based on metallic oxides applied with the HEC process not only gives the glass surface a higher mechanical resistance, but is also an ideal substrate for the subsequent CEC treatment.

The CEC treatment envisages the spray application of organic lubricants on the surface of the glass container coated with a layer of metallic oxide. The CEC treatment is typically effected at the end of a HEC treatment, during the subsequent cooling, when the temperature of the surface of the container is about 100-150° C. The organic lubricant used is normally a polyethylene emulsion. In the CEC treatment, the organic lubricant becomes firmly anchored to the metallic coating of the glass container, reducing the friction coefficient of the surface.

The combined application of the HEC and CEC treatment described above allows glass containers having a high abrasion resistance, to be prepared. This prevents, or at least limits, surface damage deriving from the friction of the containers against each other or contact of the containers with the movement devices present in the production plant. During the production process, in fact, the glass containers almost inevitably bump against each other and, if not coated, their surface inevitably shows the signs of all the knocks they have undergone.

The use of the coating process based on the HEC treatment described above has a great limit.

With HEC treatment, it is possible to apply protective coatings on the whole surface of a glass container, whereas it is not possible, on the other hand, to limit the application of the coating to only one or more pre-determinable parts of said surface, for example only to surfaces effectively subjected to possible damage. This limitation is due to the fact that HEC treatment envisages exposure of the whole surface of the container to vapours of the metallic coating compound. Furthermore, in HEC treatment it is not possible to use liquid compositions containing metallic coating compounds, as the difference in temperature between the aqueous solution (room temperature) and the surface of the glass (higher than 500° C.) on which it is applied, would cause the breakage of the latter.

With current HEC treatment techniques, it is possible, at the most, to avoid the application of the coating on the upper end of a container (for example the neck of a bottle). Through the use of a dried air jet or a flame inside the HEC chamber, in the upper part of the chamber, it is in fact possible to screen the upper part of the container, avoiding the formation of the coating on the surface of the container struck by the jet of air. Examples of these screening techniques are described in U.S. Pat. No. 3,690,289 and U.S. Pat. No. 3,934,063. The use of two or more air jets in a HEC chamber (for example, one in the lower part and one in the upper part) is not a conceivable solution, as the contemporaneous presence of two or more jets would create vertical flows of the atmosphere present in the HEC chamber with consequent exposure of the whole surface of the container to the vapours of the metallic compound, thus making any screening of the surface of the container ineffective. The same difficulty of obtaining an effective screening is present when two or more flames are used, instead of air jets. As a result of the impossibility of limiting the application of a coating to a pre-determinable surface of the glass container, the glass containers known in the state of the art have surfaces coated with metallic oxide also in areas not affected by possible surface damage.

Processes for increasing the abrasion resistance of a glass body (for example a bottle) in which the coating layer is obtained by applying an aqueous solution of an organo-titanate compound on the surface of the glass body, are also known in the state of the art (U.S. Pat. No. 3,004,863, U.S. Pat. No. 3,161,534).

The process described in U.S. Pat. No. 3,004,863 comprises the application of the aqueous solution containing the organo-titanate compound to the whole surface of the glass body, by spraying or immersion. The application of the solution is effected after the forming phase of the glass body, when this has reached room temperature. Following the application of the liquid composition, the whole glass body is subjected to an annealing treatment, consisting of slow heating up to a temperature varying from 400° C. to 670° C. (depending on the type of glass), for a duration of a few hours. The annealing phase is completed by a gradual cooling of the glass body to room temperature. Finally, at this temperature, the container is left to rest for at least 20 minutes to allow the permanent fixing of the anti-abrasive coating to the surface of the glass, before the possibility of being exposed to the risk of contact with other containers. The complete annealing of the container starting from room temperature, the subsequent cooling to return to room temperature and the further waiting time before using the coated glass body, make the process of U.S. Pat. No. 3,004,863 lengthy and costly from the point of view of energy consumption.

Although coatings based on titanium oxide are a valid alternative to those based on tin oxide, in HEC processes, coatings based on tin oxides are prevalently adopted. The use of tin-based compounds is in fact preferable for the following reasons:

(i) tin-based compounds have a lower cost than those based on titanium;

(ii) the polyethylene applied with the CEC process binds itself more easily to surfaces coated with tin oxide with respect to those coated with titanium oxide;

(iii) coatings based on tin oxide, as a result of wear, tend to give the surface a less intense yellow colouring with respect to that of titanium-based compounds;

(iv) tin-based compounds are less reactive with respect to humidity and oxygen of the air than those based on titanium.

The protective coatings of glass containers obtained according to the processes known in the state of the art also have various disadvantages.

A first disadvantage is linked to iridescence phenomena caused by the application of an excessively thick coating layer. Iridescence is in fact associated with the interference of light with the surface of the metallic oxide coating. It becomes significant when the thickness of the coating layer is comparable to the wave-length of the inciding radiation.

The iridescence effect is mainly undesired in the case of glass containers, in particular in the case of glasses and especially in the case of goblets.

In order to avoid this phenomenon, the thickness of the coating layer deposited on the surface of the glass containers must be accurately controlled, and it should not be greater than about 100 nm. Coatings of metallic oxides having a thickness of less than 100 nm, in addition to not causing iridescence phenomena, are practically invisible after application on the surface.

A second disadvantage of coatings based on metallic oxides for protecting glass containers is the appearance of a yellow colouring after repeated washings of the containers, in specific washing machines (for example, dishwashers or industrial washing machines). The appearance of this colouring creates an unpleasant aesthetic effect which gives the user a sensation of a poor cleaning degree. This is a particularly important problem in the case of glass containers destined for containing liquid food products such as glasses. In particular, iridescence is particularly evident in the case of glass goblets, as it is accentuated by the round shape of the cup. The appearance of the yellow colouring due to repeated washings is a problem which does not depend on the thickness of the coating layer. This colouring can in fact also arise in the case of containers coated with a layer of metallic oxide having an adequate thickness for preventing iridescence phenomena. The appearance of the above colouring, moreover, equally affects containers with a coating based on tin and titanium oxide.

The appearance of colouring is most likely due to the non-homogeneous consumption of the coating layer of the containers as a result of repeated washings and the chemical action of the detergents used for this purpose. The presence of a coating layer having a variable thickness on the surface of the container can in fact cause light interference phenomena similar to those at the basis of iridescence.

From what is described above, it is evident that the more extensive the coated surface of the container, the more evident the undesired effects of iridescence and the appearance of a yellow colouring will be. Also for this reason, it is therefore necessary to find a process capable of applying a protective coating only on pre-determinable areas of the surface of a container rather than indistinctly over the whole surface.

An objective of the present invention is to overcome the problems indicated by the state of the art.

In particular, an objective of the present invention is to find a process which allows a protective coating to be applied only on a pre-determinable part of the surface of a glass container, in particular a glass in the form of a goblet.

A further objective of the present invention is to find a process for applying a protective coating to the surface of glass containers which increases the abrasion resistance and at the same time is not subject to wear as a result of repeated washings.

A first object of the present invention relates to a process for increasing the abrasion resistance of a pre-determinable part of the surface of an annealed glass container comprising the following operative phases:

a) applying a liquid composition comprising an organo-titanate compound on a pre-determinable part of an annealed glass container surface by spraying at room temperature;

b) selectively heat-treating the surface on which the liquid composition of step a) has been applied at a temperature between the glass annealing temperature and glass softening temperature, said selective heat-treatment resulting in the formation of a titanium oxide coating layer on said surface.

A second object of the present invention relates to a glass container which can be obtained from the above process.

A further object of the present invention relates to the use of a liquid composition comprising tetraisopropyl-titanate dissolved in isopropyl alcohol with a concentration of titanium ranging from 0.05% to 3% by weight with respect to the overall weight of the composition in a process for increasing the abrasion resistance of a pre-determinable part of the surface of an annealed glass container.

The Applicant has surprisingly found that it is possible to use, at room temperature, liquid compositions containing organo-titanate compounds for applying a layer of protective coating on the surface of a glass container. In particular, the Applicant has found that it is possible to use the above compositions for coating only a desired pre-determinable portion of the surface of a glass container, rather than its whole surface, as is inevitable, on the contrary, in the case of HEC treatment known in the state of the art.

The process object of the present invention can be advantageously applied to annealed glass containers, i.e. to glass containers which, after the forming phase, have also been subjected to an annealing phase.

The process object of the present invention allows glass containers having a desired abrasion resistance to be obtained rapidly and with a lower energy consumption with respect to the processes known in the state of the art. Furthermore, it also attenuates the iridescence phenomenon deriving from repeated washings of the containers, in particular in the case of glass goblets.

The liquid composition based on organo-titanate compounds prepared by the Applicant, in fact, enables the use of the spray technique for distributing a precursor of the final coating based on titanium oxide, on the surface of the glass to be coated. Following the heat treatment, the precursor, i.e. the organo-titanate compound, decomposes and reacts chemically with the surface of the glass on which it has been applied, forming a film of titanium oxide coating on it.

In the description, the term "coating", "protective coating", "coating layer" and "layer of protective coating" are used as synonyms for indicating the film of titanium oxide chemically bound to the surface of the glass container which can be obtained by means of the process object of the present invention.

Figure 2:
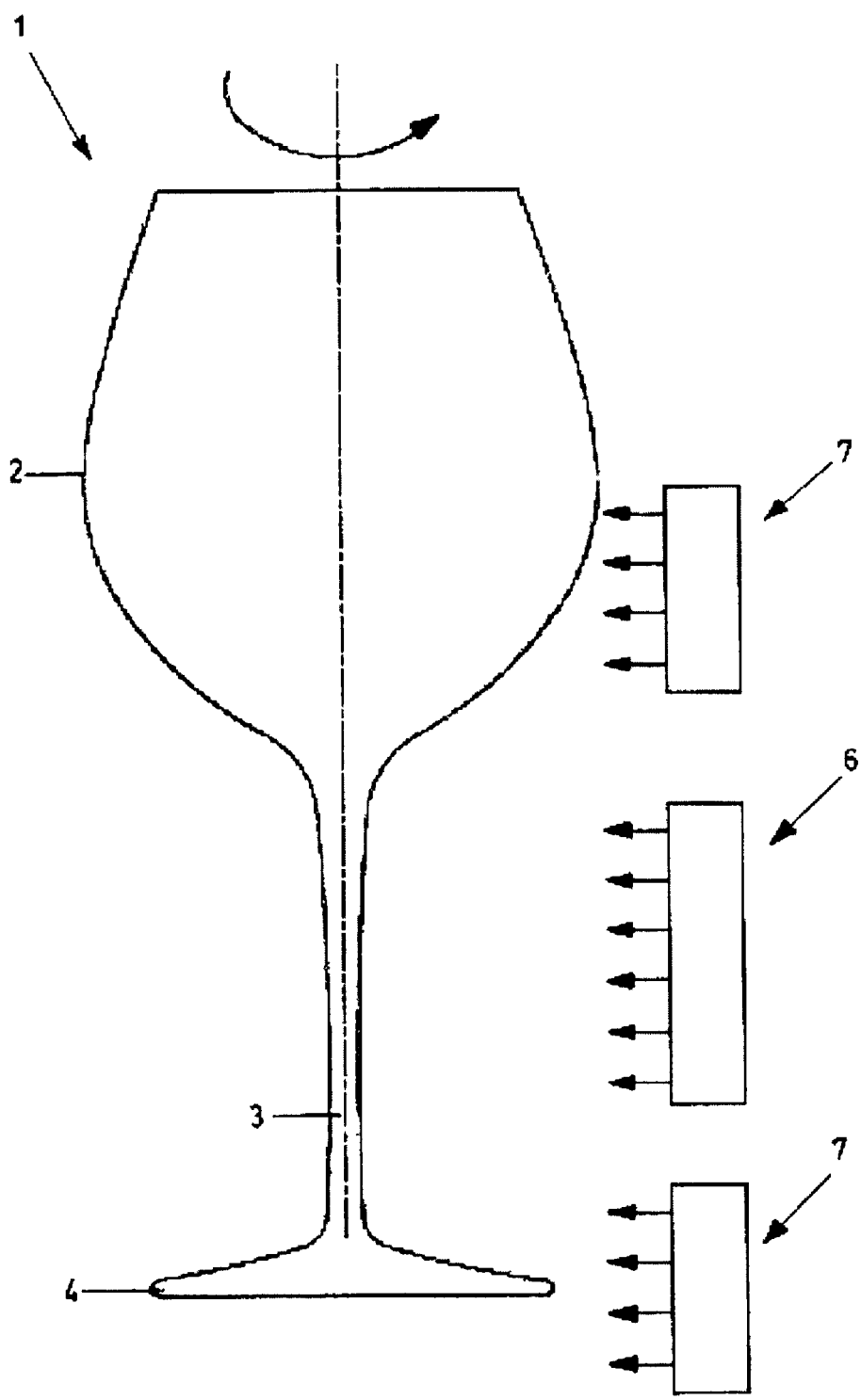
Figure 3:
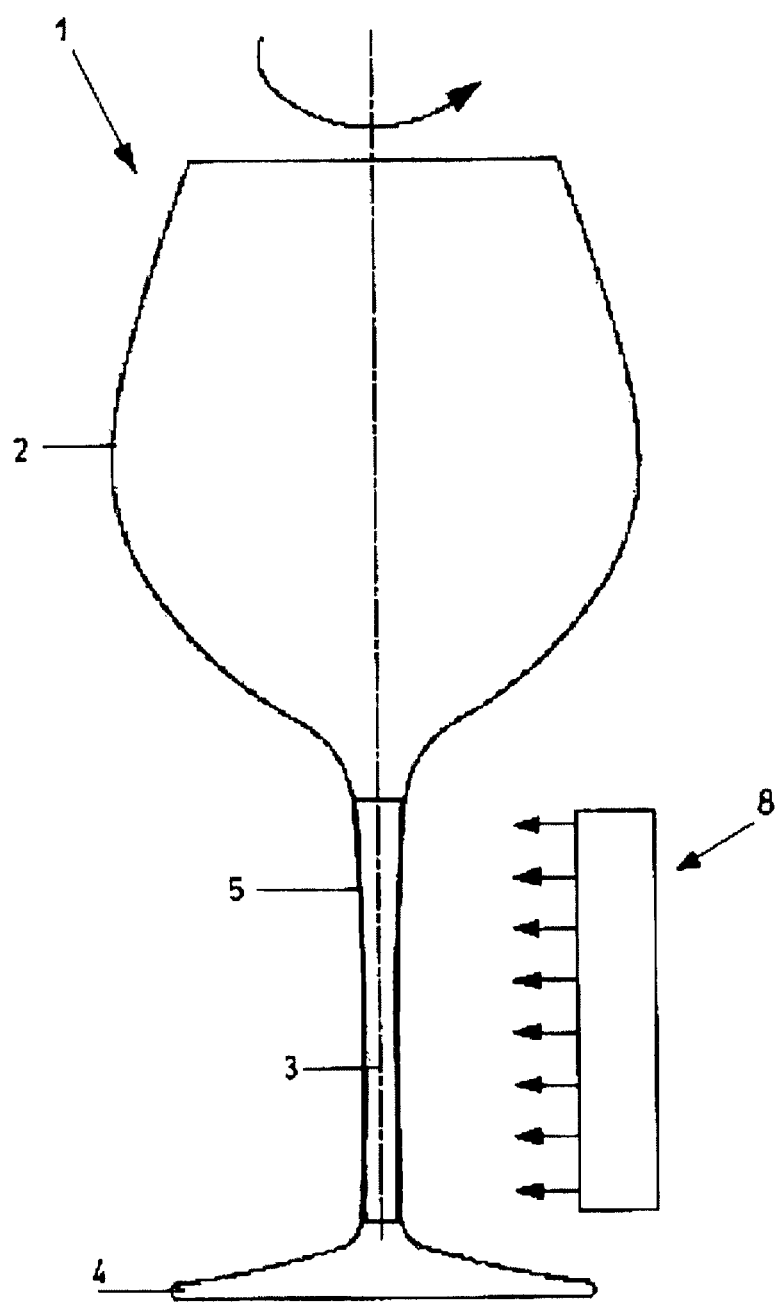

In order to have a better understanding of the characteristics of the process of the present invention, reference will be made in the description to the following figures:

FIG. 1: schematic representation of a glass container consisting of goblet, in which 1 is the goblet, 2 is the cup, 3 is the stem, 4 is the foot and 5 the coating layer;

FIG. 2: schematic representation of a glass container consisting of goblet, in which the reference numbers from 1 to 4 have the same meaning indicated for FIG. 1, 6 is a device for spraying a liquid composition onto the stem 3 and 7 is a device for sending a jet of dry air onto the cup 2 and foot 4;

FIG. 3: schematic representation of a glass container consisting of goblet, in which the reference numbers from 1 to 5 have the same meaning indicated for FIG. 1 and 8 is a heating device.

The liquid composition used in phase a) of the process, object of the present invention comprises at least one organo-titanate compound dissolved in a suitable organic solvent. For the preparation of the liquid composition, compounds of the organo-titanate type are used, which are thermally decomposable within the temperature range between the annealing temperature of the glass and glass softening temperature (or point) (for temperatures higher than the softening temperature there would be a significant variation in the form of the surface of the glass treated thermally). The softening temperature varies in relation to the chemical composition of the glass. The softening temperature of a sodium-calcium glass generally varies from 700° C. to 750° C., whereas the annealing temperature varies from 500 to 550° C. As the temperature range of the heat treatment of phase b) is within the range of 500-600° C., organo-titanate compounds are used which are thermally decomposable within this temperature range. The temperature range of 500-600° C., moreover, is particularly suitable for the application of the process of the present invention to a glass coating of the sodium-calcium type.

In the description of the present invention, the glass softening temperature values are measured in accordance with the standard method ASTM C338-93(1998), whereas the glass annealing temperature is measured according to the standard method ASTM C336-71 (2000).

The organo-titanate compound is preferably a compound of the alkyl-titanate type, and is more preferably tetra-isopropyl-titanate.

The organic solvent is selected in relation to the organo-titanate compound used. When the compound is tetra-isopropyl-titanate, the solvent is preferably isopropyl alcohol.

The alkyl-titanates can be prepared using the methods and synthesis techniques known to experts in the field. The alkyl-titanates, in particular tetra-isopropyl-titanate, are also commercially available.

The concentration of titanium in the liquid composition ranges from 0.05% to 3% by weight with respect to the overall weight of the composition, preferably from 0.08% to 1%.

Considering the high reactivity of the alkyl-titanates with respect to the atmospheric humidity and oxygen, the liquid composition can also comprise a stabilizing additive, such as for example acetylacetone.

A particularly preferred liquid composition (composition A) to be used in the process, object of the present invention, comprises:

tetraisopropyl-titanate dissolved in isopropyl alcohol with a titanium concentration ranging from 0.05% to 3% by weight with respect to the overall weight of the composition, preferably from 0.08% to 1%;

acetylacetone in a molar ratio of 2 to 1 with respect to the titanium compound.

The use of the above liquid composition, in fact, allows the surface of a glass container to be particularly effectively coated.

In phase a), the application of the liquid composition on a surface of the glass container is effected with the spray technique. This technique allows the liquid composition to be precisely and rapidly distributed uniformly on a pre-determinable part of the surface of the container.

The glass container on which the process object of the present invention can be applied, comprises a base and a top. The predeterminable part of the surface of the glass container whose abrasion resistance is to be increased is preferably a portion of the surface of the container between a surface portion of the base and a surface portion of the top.

The process according to the invention is described in detail hereunder with reference to its use for coating a predeterminable part of the surface of a glass container, the container consisting of a goblet 1 in which the base is the foot 4 of the goblet, the top is the cup 2 and the predeterminable part to be coated is the stem 3 of the goblet. As is evident from the description, however, the process is not exclusively limited to this embodiment.

With reference to the figures, in phase a) of the process, object of the present invention, a liquid composition comprising an organo-titanate compound (for example composition A described above) is applied by spraying onto the surface of the stem 3 of a goblet 1.

The application of the liquid composition is effected at room temperature by spraying through a spraying device 6, consisting for example of one or more adjacent nozzles.

The spraying effected in phase a) exclusively relates to the stem of the goblet 1. The transversal section of the stem of a glass goblet is typically substantially circular and has a diameter varying from 5 mm to 15 mm, preferably from 5 mm to 10 mm. The diameter of the transversal section may not be uniform along the whole of the stem. In order to obtain a uniform distribution of the liquid composition, the goblet 1 is rotated during the spraying, around its vertical axis in order to complete at least one full rotation. Alternatively, two spray devices can be used, situated in opposite parts with respect to the goblet. In this case, the goblet does not need to be rotated.

In a preferred embodiment of the process, the goblet 1 is not only rotating on itself but also has a translational motion with respect to the spray device 6 (for example, in an industrial production line). The spray device 6 preferably moves along a parallel direction with respect to the translation direction of the goblet 1, in the same direction and at the same rate as the goblet 1. As an alternative to the use of one or more movable spray devices, a plurality of fixed spray devices can be used, positioned adjacent to each other along the translation direction of the goblet 1. In this case, the number of spray devices varies in relation to the translation rate of the goblet 1.

The duration of phase a) preferably varies within a range of 1 to 10 seconds, preferably from 3 to 5 seconds. Through experimental tests, an expert in the field can optimize the quantity and pressure of the liquid composition leaving the nozzles, the atomization air pressure necessary for the spraying, in addition to the distance of the nozzles from the surface of the stem 3 of the goblet 1 in order to obtain the above duration of the spraying phase and guarantee the uniform application of the liquid composition on the selected portion of surface to be coated. The thickness of the coating applied, as will appear evident to an expert in the field, can be easily determined, before the application, by calculating the necessary concentration of the organo-titanate compound in the liquid composition.

With the spray technique, it is possible to accurately apply the liquid composition onto the stem 3, preventing the liquid composition from also being deposited on the surface of the cup 2 or of the foot 4.

Although not indispensable, in a preferred embodiment of the process, object of the present invention, phase a) also comprises the operation of screening one or more pre-determinable parts of the surface of the glass container from the application of the liquid composition.

In this embodiment of the process:
the glass container is a goblet 1 comprising a cup 2, a stem 3 and a foot 4;
the pre-determinable part of the glass container surface on which the liquid composition is applied comprising an organo-titanate compound is the surface of the stem 3 of said goblet 1;
the parts of the glass container surface screened from the application of the liquid composition comprising an organo-titanate compound are the surface of the foot 4 and/or that of the cup 2.

The screening operation can be effected by the application of one or more dried air jets which strike the part or parts of the surface to be screened. The air jets can be produced by means of suitable devices 7 situated in a suitable position with respect to the goblet 1 (FIG. 2), for example of the nozzles for blowing compressed air.

It should be noted that, contrary to what can be obtained with the coating processes known in the state of the art (HEC treatment), with the process object of the present invention, it is possible to effect the contemporaneous screening of the cup and foot of a goblet, thus reducing the possible undesired effects of iridescence or yellow colouring, which appear on the cup after washing treatment, and limiting the quantity of product used for forming the coating. Furthermore, by selectively only subjecting the portion of surface on which the liquid composition is applied to heat treatment, the quantity of energy and time necessary for obtaining a finished product with the desired abrasion resistance characteristics, are also reduced.

In phase b) of the process object of the present invention, the surface on which the liquid composition has been applied in phase a), i.e. the stem 3 of the goblet 1, is selectively thermally treated at a temperature ranging from the glass annealing temperature and the glass softening temperature.

The selective heat treatment causes the decomposition of the organo-titanate compound applied to the surface of the stem 3 in phase a) and reaction with the surface of the glass with the formation of a coating layer of titanium oxide.

The glass softening temperature, i.e. the temperature at which the surface of the glass begins to undergo a significant deformation varies in relation to the composition, form and thickness of the glass. The temperature of the heat treatment of phase b) is preferably within the range of 500-600° C.

The selective heat treatment of the surface on which the liquid composition has been applied in phase a) can be effected by means of suitable heating devices (FIG. 3). These devices can, for example, be radiant gas burners or infrared radiation irradiation devices. Radiant gas burners are preferably used as they allow an easier temperature control of the treatment and a greater constancy and uniformity of the heat supply.

The heat treatment can also be effected by direct contact of the glass surface on which the liquid composition has been applied in phase a) with a combustion flame. Flame heating, however, not only does not allow the quantity of heat transferred to the glass surface to be regulated, but also leaves carbonaceous residues on the surface of the stem with undesired aesthetic effects.

With the above radiant gas burners and infrared radiation irradiation devices, it is possible to only thermally treat the part of the surface on which the liquid composition has been sprayed, considerably reducing the energy requirement of the process.

Phase b) of the process can be effected a few seconds after the end of phase a). The duration of the heat treatment of phase b) varies from 30 to 60 seconds.

At the end of phase b), the glass container, in the case illustrated the stem of the goblet, is coated by a coating layer of titanium oxide. The coating layer is practically invisible. As this layer does not cause iridescence effects, its thickness is presumably less than 100 nm.

The stem obtained in phase b) has a harder surface with respect to the same stem not subjected to the process object of the present invention and a lower friction coefficient. These characteristics make the stem more resistant to glass-glass friction and, more generally, to abrasion. The titanium oxide coating prevents the formation of surface microfractures which represent potential breakage trigger points when the stem is subjected to stress deriving from traction, bending or torsion.

In a preferred embodiment, the process object of the present invention, after phase b), also comprises the following operative phase:
c) applying an organic lubricating compound on the glass surface coated with titanium oxide obtained in phase b), said surface being kept at a temperature between 100 and 150° C.

Phase c) consists in a CEC treatment of the type normally adopted in the state of the art. The composition used is preferably an aqueous polyethylene emulsion.

For effecting phase c), the temperature of the glass surface covered by titanium oxide, i.e. that of the stem in the case of the coating of the stem of a goblet, must be within the range of 100-150° C. In the process object of the present invention, this temperature is generally reached about 30 seconds after the end of phase b).

The treatment of phase c) contributes to further lowering the friction coefficient of the surface of glass containers, in the case illustrated the surface of the stem of goblets, and increasing its smoothness in the case of glass-glass friction. This treatment also further improves the mechanical resistance of the surface coating with titanium oxide and consequently that of the whole container.

As coatings based on metallic oxides represent an ideal substrate for the application of an organic lubricating compound, in phase c), a strong anchoring of the organic lubricating compound onto the surface of the coated glass, is obtained.

The coating obtained in phase b), with or without combination with the additional coating obtained in phase c), is resistant to numerous industrial washing cycles (over 4,000 industrial washings). This coating can therefore be considered permanent.

The process, object of the present invention, has various advantages with respect to the processes known in the state of the art for increasing the abrasion resistance of a glass container.

The process, object of the present invention allows the application of a titanium oxide coating on a pre-determinable part of the surface of a glass container, i.e. exclusively to a selected portion of its overall surface. This is made possible by selecting to apply liquid compositions comprising organotitanate compounds at room temperature, instead of adopting compounds in vapour phase as currently of use in the HEC treatment known in the state of the art.

The process object of the present invention allows the abrasion resistance of the surface of glass containers to be increased only in selected areas, such as for example the areas most widely exposed to friction or contact with the movement devices generally present in plants for the production or during the use of glass containers.

The process object of the present invention is especially suitable for applying a coating of titanium oxide to glasses in the form of a goblet. In particular, thanks to this process, it is possible to apply a coating layer of titanium oxide only on the stem of a glass goblet, avoiding the application of the coating to the surface of the cup or foot. The possibility of excluding the cup and the foot of a goblet is, on the contrary, precluded in processes for increasing the mechanical resistance of glass containers known in the state of the art (HEC treatment).

Furthermore, the process object of the present invention is much easier to effect than coating processes based on HEC treatment which use $SnCl_4$ and $TiCl_4$. It does not require, in fact, controlled humidity conditions and consequently does not necessitate the use of the expedients envisaged in the above HEC treatment for guaranteeing these operative conditions.

The preparation, use and preservation of the liquid compositions is also much simpler and practical than the use of compounds in vapour phase as in the case of $SnCl_4$ and $TiCl_4$.

The use of liquid compositions also simplifies the control of the final thickness of the titanium oxide coating on the surface of the container.

The glass containers on which a coating of titanium oxide has been applied according to the process, object of the present invention, do not have problems relating to iridescence and undesired yellow colouring typically observed in the state of the art. In particular, in the case of goblets, by applying the coating exclusively to the stem, the extension of the surface subject to the formation of an iridescence phenomenon, is reduced. The coating layer applied is invisible and has a thickness which does not cause iridescence effects. The coating applied, moreover, lasts with time and cannot be removed even after numerous industrial washings.

The increase in the mechanical resistance of the surfaces of the glass containers on which the coating is applied by means of the process of the present invention, is equal to about 140% of the mechanic resistance of the same surfaces which have not been treated. This considerably increases the useful life of the containers, in particular of glass goblets whose stems are extremely fine (up to a diameter of only 5 mm) and which are therefore the mechanically weakest part of this type of container.

The following embodiment examples are provided for purely illustrative purposes of the present invention and should not be considered as limiting its protection scope as defined in the enclosed claims.

EXAMPLE 1

A liquid composition was prepared in the following way. A commercial composition containing tetra-isopropyl titanate dissolved in isopropyl alcohol (8% by weight of titanium), stabilized with acetylacetone in a molar ratio of 2 to 1 with respect to the titanium, was diluted with isopropyl alcohol in a ratio of 1 to 100.

The diluted liquid composition had a titanium concentration equal to 0.08% by weight with respect to the overall weight of the composition.

EXAMPLE 2

The process according to the present invention was applied for increasing the abrasion resistance of the surface of the stem alone of glass goblets.

Phase a) of the spray process was effected at room temperature, using the diluted liquid composition of Example 1.

During phase a) a jet of dried air was used for screening the surface of the foot of the goblet.

The goblets were then subjected to heat treatment (phase b) at a temperature of 560° C. using radiant gas burners.

At the end of phase b), the goblets whose stem had been coated with a layer of titanium oxide were subjected to a further CEC treatment (phase c), by spraying an emulsion of polyethylene at a temperature of 150° C.

The abrasion resistance properties of the goblets subjected to the above process (treated goblets) were tested as follows.

24 treated goblets were divided into twelve pairs. The stems of each pair of goblets were manually rubbed against each other to cause surface abrasions of the type generally created by glass-glass contact.

Analogously, 24 goblets not subjected to the process of the present invention (untreated goblets) were divided into twelve pairs. The stems of each pair of goblets were manually rubbed against each other to cause surface abrasions of the type generally created by glass-glass contact.

The stems of the treated goblets and those of the untreated goblets were subjected to impact strength tests, using an "Impact Tester" instrument of the company American Glass Research. The tests were effected according to the regulation UNI 9302:1988 (Glass containers. Determination of impact strength). In order to test the impact strength of the stem alone, during the test, the goblet was kept anchored to the rest surface by means of the foot.

The results of the tests effected on the stems of the treated and untreated goblets are indicated in Table 1 and Table 2 respectively.

TABLE 1

Results of impact strength tests effected on treated goblets

| Impact load (Inch Pounds) | Nr. of broken goblets (out of a total of 24) | Percentage of broken goblets |
|---|---|---|
| 0.2 | 0 | 0 |
| 0.4 | 0 | 0 |
| 0.6 | 0 | 0 |

TABLE 1-continued

Results of impact strength tests effected on treated goblets

| Impact load (Inch Pounds) | Nr. of broken goblets (out of a total of 24) | Percentage of broken goblets |
|---|---|---|
| 0.8 | 0 | 0 |
| 1 | 0 | 0 |
| 1.5 | 0 | 0 |
| 2 | 0 | 0 |
| 2.5 | 0 | 0 |
| 3 | 0 | 0 |
| >3 | 24 | 100 |

TABLE 2

Results of impact strength tests effected on untreated goblets

| Impact load (Inch Pounds) | Nr. of broken goblets (out of a total of 24) | Percentage of broken goblets |
|---|---|---|
| 0.2 | 0 | 0 |
| 0.4 | 0 | 0 |
| 0.6 | 0 | 0 |
| 0.8 | 2 | 8 |
| 1 | 5 | 21 |
| 1.5 | 17 | 71 |

The results of Tables 1 and 2 demonstrate that the process according to the present invention is capable of producing a layer of protective coating on the stems of goblets which improves their abrasion resistance and consequently impact strength.

The experimental data show that the resistance to an impact load of the stems of the treated goblets is, on an average, higher than 100% with respect to that of the untreated goblets subjected to the same manual friction treatment.

The invention claimed is:

1. Process for increasing the abrasion resistance of only a predetermined part of an annealed glass container surface comprising:
   a) applying a liquid composition comprising an organo-titanate compound on a predetermined part of the annealed glass container surface by spraying at room temperature; and
   b) selectively heat-treating the surface on which the liquid composition of a) has been applied at a temperature between the glass annealing temperature and the glass softening temperature, said selective heat-treatment resulting in the formation of a titanium oxide coating layer on said surface;
   wherein the glass container is a goblet comprising a cup, a stem and a foot, and
   wherein the predetermined part of the glass container surface on which the liquid composition is applied is the surface of only the stem of said goblet.

2. Process according to claim 1, wherein the heat-treatment of b) is carried out at a temperature between 500° C. and 600° C.

3. Process according to claim 1, further comprising:
   c) applying a lubricating organic compound on the surface coated with titanium oxide obtained in b), said surface being kept at a temperature between 100 and 150° C.

4. Process according to claim 3, wherein the lubricating organic compound is an aqueous polyethylene emulsion.

5. Process according to claim 1, wherein a) further comprises screening one or more predetermined parts of the glass container surface from the application of the liquid composition comprising an organo-titanate compound.

6. Process according to claim 5, wherein the screening one or more predetermined parts of the glass container surface is carried out through one or more dried air jets which collide with the part or parts of the surface to be screened.

7. Process according to claim 5, wherein:
   the parts of the glass container surface screened from the application of the liquid composition comprising an organo-titanate compound are the foot surface and/or the cup surface.

8. Process according to claim 1, wherein the heat-treatment of b) is carried out through radiant gas burners.

9. Process according to claim 1, wherein during the spraying of a) the container is rotated around its vertical axis so as to complete at least one full rotation around itself.

10. Process according to claim 1, wherein the organo-titanate compound is an alkyl-titanate compound.

11. Process according to claim 1, wherein the liquid composition of a) comprises:
   tetraisopropyl-titanate dissolved in isopropyl alcohol with a titanium concentration between 0.05% and 3% by weight with respect to the overall weight of the composition; and
   acetylacetone with a 2:1 molar ratio with respect to the titanium compound.

* * * * *